US012300283B1

(12) United States Patent
Cauterucio et al.

(10) Patent No.: US 12,300,283 B1
(45) Date of Patent: May 13, 2025

(54) DATA STORAGE DEVICE EXECUTING HOST ACCESS COMMANDS IN A MANNER TO OPTIMIZE PERFORMANCE AND REDUCE ENERGY COSTS

(71) Applicant: Western Digital Technologies, Inc., San Jose, CA (US)

(72) Inventors: Stephen Cauterucio, San Jose, CA (US); Abigail Cheng, Aliso Viejo, CA (US); Andrew Larson, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/410,679

(22) Filed: Jan. 11, 2024

(51) Int. Cl.
*G11B 5/55* (2006.01)
(52) U.S. Cl.
CPC ................... *G11B 5/5547* (2013.01)
(58) Field of Classification Search
None
See application file for complete search history.

(56) References Cited

U.S. PATENT DOCUMENTS

| | | | | |
|---|---|---|---|---|
| 4,039,918 A * | 8/1977 | Cheng | ................... | G05B 19/291 318/673 |
| 5,418,971 A * | 5/1995 | Carlson | ................. | G06F 3/0611 710/24 |
| 5,570,332 A * | 10/1996 | Heath | ..................... | G11B 19/20 360/78.04 |
| 5,854,941 A * | 12/1998 | Ballard | ................ | G11B 27/105 710/5 |
| 6,145,052 A * | 11/2000 | Howe | .................... | G11B 19/02 711/112 |
| 6,987,639 B1 * | 1/2006 | Yu | ........................ | G11B 5/5526 710/39 |

(Continued)

FOREIGN PATENT DOCUMENTS

JP         2003308176 A     10/2003

OTHER PUBLICATIONS

Hikida et al., A Power Saving Storage Method That Considers Individual Disk Rotation, Retrieved from https://link.springer.com/chapter/10.1007/978-3-642-29035-0_10, 2012, pp. 2.

(Continued)

*Primary Examiner* — Peter Vincent Agustin
(74) *Attorney, Agent, or Firm* — NOD Law PC

(57) ABSTRACT

A data storage device executes access commands received from a host by a recording head actuated over a magnetic storage medium. A target command is selected from queued host access commands. A free command is selected that can be executed during a time required for a seek from the recording head location to a target command location. A seek energy difference between the energy required to seek from the recording head location to a free command location to the target command location, and to seek from the recording head location directly to the target command location is determined. The device seeks to and executes the free and target commands if the seek energy difference is less than a threshold, and seeks directly to the target command if the seek energy difference is greater than the threshold.

24 Claims, 6 Drawing Sheets

(56) References Cited

U.S. PATENT DOCUMENTS

| | | | |
|---|---|---|---|
| 7,450,334 B1* | 11/2008 | Wang | G11B 20/10527 |
| | | | 360/75 |
| 8,797,669 B1* | 8/2014 | Burton | G11B 27/3027 |
| | | | 360/39 |
| 9,600,205 B1 | 3/2017 | Nowell et al. | |
| 10,014,018 B1* | 7/2018 | Kiyonaga | G11B 5/5547 |
| 11,010,099 B1 | 5/2021 | Hall | |
| 11,295,781 B1* | 4/2022 | Liu | G11B 5/5569 |
| 11,656,797 B2 | 5/2023 | Hall | |
| 2003/0033474 A1* | 2/2003 | Lin | G06F 3/0659 |
| | | | 711/111 |
| 2003/0174433 A1* | 9/2003 | Espeseth | G11B 5/5547 |
| | | | 360/78.07 |
| 2012/0260047 A1 | 10/2012 | Haines et al. | |
| 2020/0286512 A1* | 9/2020 | Hall | G11B 5/59688 |
| 2021/0096764 A1* | 4/2021 | Calfee | G06F 3/0676 |

OTHER PUBLICATIONS

Mhdawy et al., An Energy Effiecient Approach for Big Data Mass Storage Systems Using a Sequential Cache, Dec. 15, 2022, Journal of Theoretical And Applied Information Technology, vol. 100, No. 23, pp. 6882-6890.

Yu et al., A Dynamic Disk Drive Power Management Algorithm, Retrieved from https://cseweb.ucsd.edu/classes/fa05/cse226/public_html/PROJECTS/DynamicSpindown.pdf on Jul. 19, 2023, pp. 15.

Zedlewski et al., Modeling Hard-Disk Power Consumption, Retrieved from https://homes.cs.washington.edu/~arvind/papers/dempsey.pdf on Jul. 19, 2023, pp. 14.

* cited by examiner

DATA STORAGE DEVICE EXECUTING HOST ACCESS COMMANDS IN A MANNER TO OPTIMIZE PERFORMANCE AND REDUCE ENERGY COSTS

BACKGROUND

Data storage devices such as disk drives comprise a magnetic storage medium such as a disk and a recording head connected to a distal end of an actuator arm that is rotated about a pivot by a voice coil motor (VCM) to position the recording head radially at a carefully controlled fly height over the disk. The disk comprises a plurality of radially spaced, concentric tracks for recording user data sectors and servo sectors. The servo sectors comprise head positioning information (e.g., a track address) that is read by the recording head and processed by a servo control system to control the actuator arm as it seeks from track to track. A disk drive typically comprises a plurality of disks each having a top and bottom surface accessed by a respective recording head. The VCM typically rotates a number of actuator arms about a pivot in order to simultaneously position a number of recording heads over respective disk surfaces based on servo data recorded on each disk surface.

FIG. 1 is a conceptual diagram of a conventional disk format 2 comprising a number of servo tracks 4 defined by servo sectors $6_0 \ldots 6_N$ recorded around the circumference of each servo track 4. Each servo sector $6_i$ comprises a preamble 8 for storing a periodic pattern that allows proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo sector $6_i$ further comprises groups of servo bursts 14 (e.g., N and Q servo bursts) that are recorded with a predetermined phase relative to one another and relative to the servo track centerlines. The phase-based servo bursts 14 provide fine head positioning information used for centerline tracking while accessing a data track during read and write operations. A position error signal (PES) generated by reading servo bursts 14 represents a measured position of the recording head relative to a centerline of a target servo track. A servo controller processes the PES to generate a control signal applied to an actuator to actuate the recording head radially over the disk in a direction that reduces the PES.

The description provided in this background section should not be assumed to be prior art merely because it is mentioned in or associated with this background section. The background section may include information that describes one or more aspects of the subject technology.

SUMMARY

The following summary relates to one or more aspects or embodiments disclosed herein. It is not an extensive overview relating to all contemplated aspects or embodiments, and should not be regarded as identifying key or critical elements of all contemplated aspects or embodiments, or as delineating the scope associated with any particular aspect or embodiment. The following summary has the sole purpose of presenting certain concepts relating to one or more aspects or embodiments disclosed herein in a simplified form to precede the detailed description that follows.

Some aspects of this disclosure are directed to a data storage device comprising a magnetic storage medium and a recording head configured to be actuated over the magnetic storage medium. Control circuitry is configured to select a target command from one or more access commands received from a host and stored in a host queue, select a free command that can be executed during a target seek time required for a target seek from a recording head location to a target command location on the magnetic storage medium, and determine a seek energy difference between (a) a sum of a first free seek energy required to seek from the recording head location to a free command location and a second free seek energy required to seek from the free command location to the target command location, and (b) a target seek energy required to seek from the recording head location directly to the target command location. In response to the seek energy difference being less than a predetermined threshold, the control circuitry is configured to seek to and execute the free command and then seek to and execute the target command. In response to the seek energy difference being greater than the predetermined threshold, the control circuitry is configured to seek directly to and execute the target command.

In some implementations, the control circuitry is further configured to select the target command by balancing the target seek time with an energy cost of the target seek.

In some implementations, the control circuitry is further configured to dynamically move the predetermined threshold based on an amount of free storage space remaining in a device cache.

In some implementations, the control circuitry is further configured to dynamically move the predetermined threshold to a decreased seek energy difference when the amount of free storage space remaining in the device cache increases, and to an increased seek energy difference when the amount of free storage space remaining in the device cache decreases. In some implementations, the host queue has a queue depth (QD) of one.

In some implementations, the control circuitry is further configured to move write commands received from the host from the host queue to the device cache.

In some implementations, the target command is a read command and the free command is a write command.

In some implementations, the device cache is a DRAM.

In some implementations, the control circuitry is further configured to select the free command from the device cache.

In some implementations, the control circuitry is further configured to select the free command from background commands of the data storage device.

In some implementations, the control circuitry is further configured to select the free command from the host queue as part of a leapfrog sort.

In some implementations, the control circuitry is further configured to execute multiple free commands during the target seek time required for the target seek from the recording head location to the target command location.

Other aspects of this disclosure are directed to a method for executing access commands received from a host in a data storage device having a recording head configured to be actuated over a magnetic storage medium. The method comprises selecting a target command from one or more access commands received from the host and stored in a host queue, selecting a free command that can be executed during a target seek time required for a target seek from a recording head location to a target command location on the magnetic storage medium, and determining a seek energy difference between (a) a sum of a first free seek energy required to seek from the recording head location to a free command location and a second free seek energy required to seek from the free command location to the target command location, and (b) a target seek energy required to seek from the recording head location directly to the target command location. In response to the seek energy difference being less than a predetermined threshold, the method seeks to and executes the free command and then seeks to and executes the target command. In response to the seek energy difference being greater than the predetermined threshold, the method seeks directly to and executes the target command.

Further aspects of this disclosure are directed to control circuitry for causing access commands received from a host in a data storage device to be executed by a recording head configured to be actuated over a magnetic storage medium. The control circuitry is configured to select a target command from one or more queued host access commands, select a free command that can be executed during a target seek time required for a target seek from a recording head location to a target command location on the magnetic storage medium, and determine a seek energy difference between energy required to (a) seek from the recording head location to a free command location to the target command location, and (b) seek from the recording head location directly to the target command location. In response to the seek energy difference being less than a predetermined threshold, the control circuitry is configured to seek to and execute the free command and then the target command. In response to the seek energy difference being greater than the predetermined threshold, the control circuitry is configured to seek directly to and execute the target command.

Various additional aspects of this disclosure are described below and depicted in the accompanying figures and will be further apparent based thereon.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout the different views. The drawings depict only illustrative examples of this disclosure and are not limiting in scope.

DETAILED DESCRIPTION

The words "exemplary" and "example" as used herein mean "serving as an example, instance, or illustration." Any embodiment described herein as "exemplary" or as an "example" should not be construed as preferred or advantageous over other embodiments.

The embodiments described herein do not limit the invention to the precise form disclosed, nor are they exhaustive. Rather, various embodiments are presented to provide a description for utilization by others skilled in the art. Technology continues to develop, and elements of the disclosed embodiments may be replaced by improved and enhanced items. This disclosure inherently discloses elements incorporating technology available at the time of this disclosure.

Figure 1:
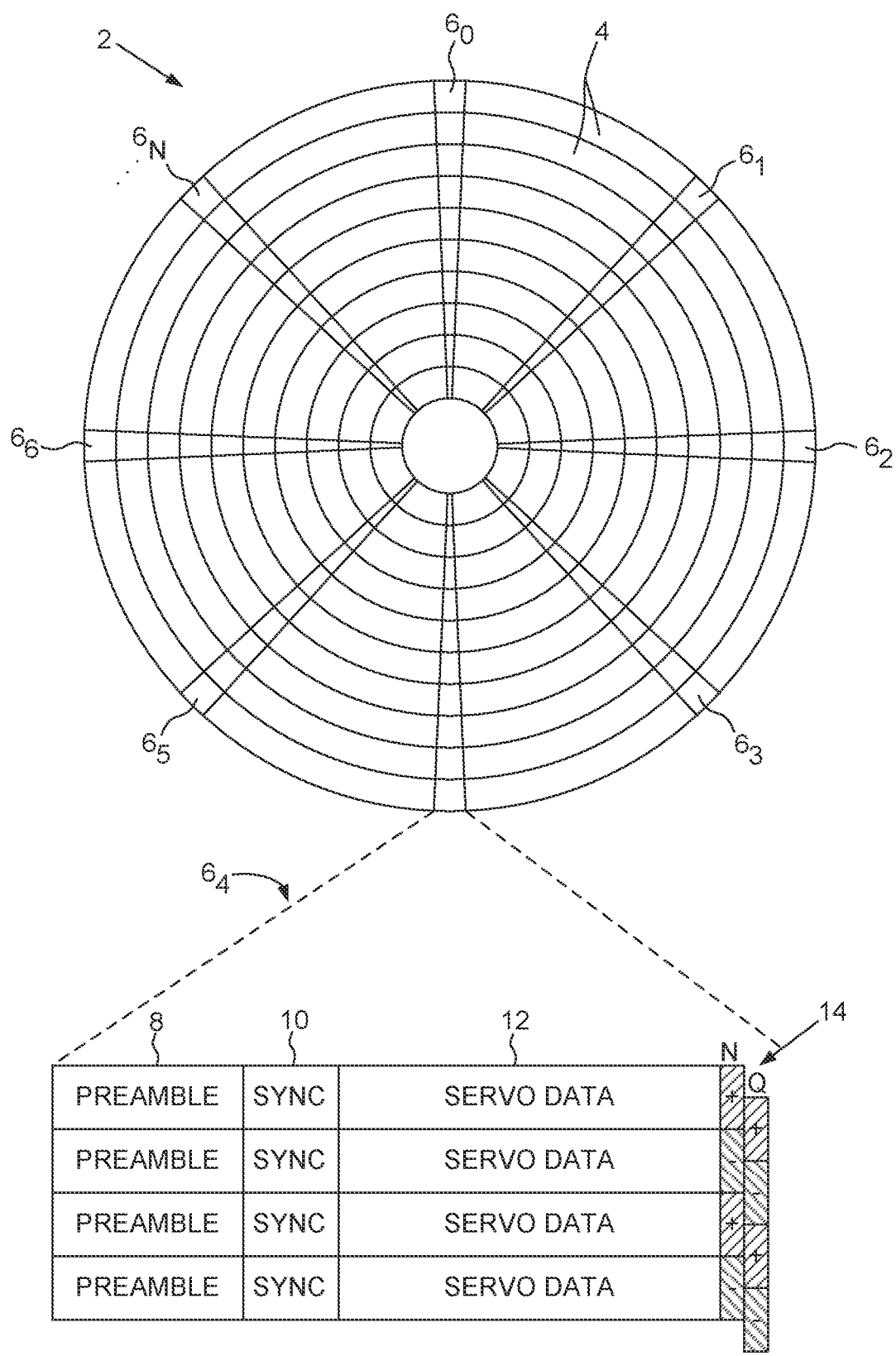
FIG. 1 is a conceptual diagram of a conventional disk format, in accordance with aspects of this disclosure.
Figure 2:
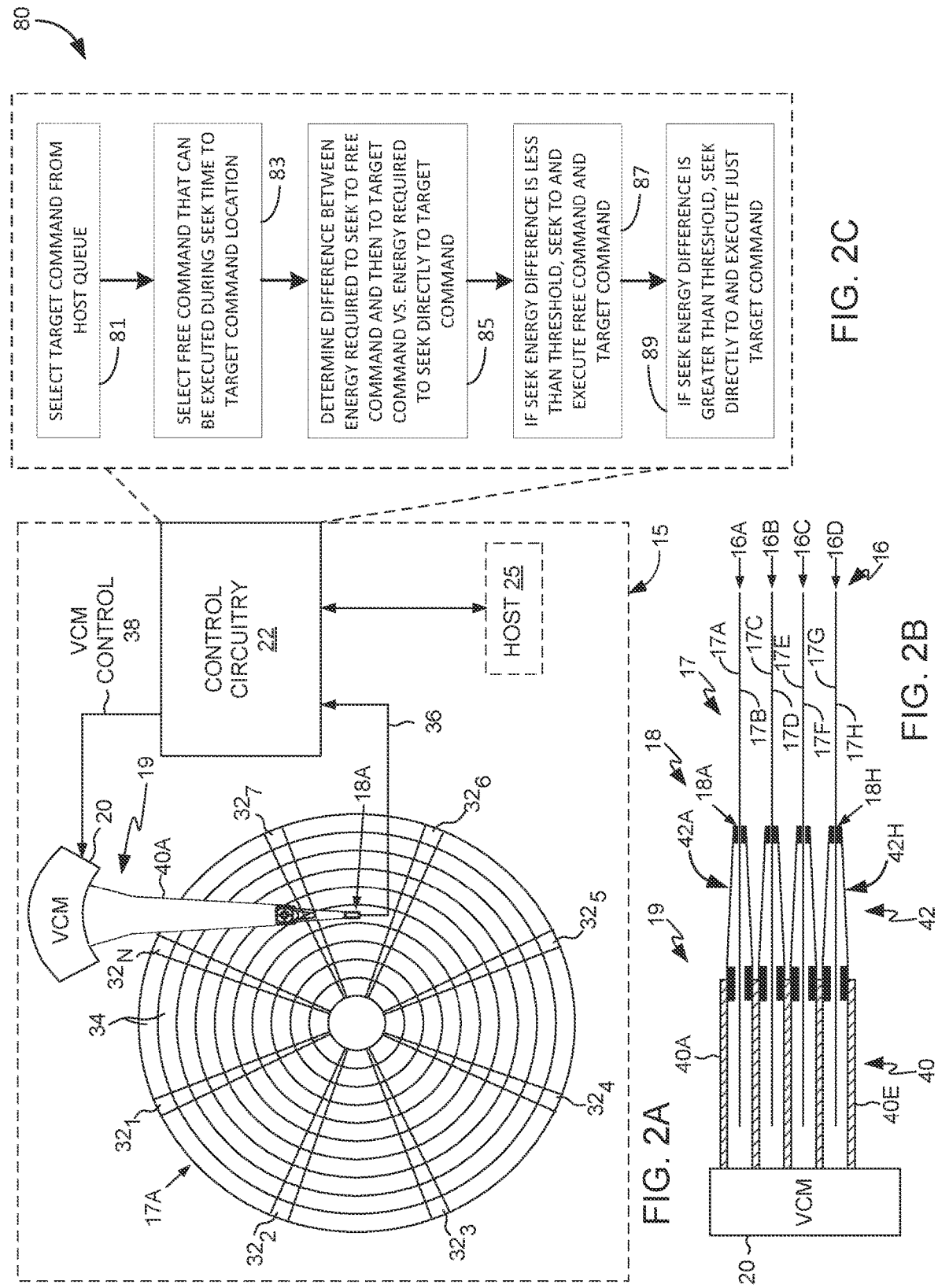
FIG. 2A is a conceptual diagram of a top view of a data storage device in the form of a hard disk drive (HDD), in accordance with aspects of this disclosure.
FIG. 2B is a conceptual diagram of a side view of a data storage device in the form of an HDD, in accordance with aspects of this disclosure.
FIG. 2C is a flow diagram of a method that a data storage device may perform, execute, and implement, in accordance with aspects of this disclosure.

While a data storage device in the form of a disk drive with rotating magnetic storage media is primarily referred to in the examples discussed herein, the data storage device may instead comprise or additionally include other types of non-volatile storage media, such as magnetic tape media, optical media, etc. FIGS. 2A and 2B are conceptual top and side views of a data storage device in the form of hard disk drive (HDD) 15, in accordance with aspects of this disclosure. HDD 15 comprises recording heads 18 (e.g., recording heads 18A ... 18H) that are actuated over surfaces 17 (e.g., surfaces 17A ... 17H) of magnetic storage media 16 (e.g., disks 16A ... 16D) by actuator assembly 19.

HDD 15 further comprises control circuitry 22 configured to implement method 80 of FIG. 2C for executing read and write access commands received from a host, such as host 25. Method 80 executes host access commands in a manner that both optimizes performance and reduces energy cost. In step 81, a target command is selected from access commands received from the host and stored in a host queue. The target command selection may involve balancing performance with energy cost. In step 83, a free command is selected that can be executed during the time required to seek from a recording head location to a target command location on the magnetic storage media. Step 85 determines a seek energy difference between (a) a sum of the energies required to seek from the recording head location to the free command location and from the free command location to the target command location, and (b) the energy required to seek from the recording head location directly to the target command location. If the seek energy difference is less than a predetermined threshold, the HDD seeks to and executes both the free command and the target command (step 87). If the seek energy difference is greater than the threshold, the HDD seeks directly to and executes just the target command (step 89). The predetermined threshold is moved dynamically based on an amount of free storage space remaining in a device cache.

Referring again to FIG. 2A, top surface 17A of disk 16A comprises a plurality of servo sectors 32 (e.g., servo sectors 32₁ ... 32N) that define a plurality of servo tracks, wherein data tracks 34 are defined relative to the servo tracks at the same or a different radial density. Control circuitry 22 processes read signal 36 emanating from recording head 18A to demodulate the servo sectors and generate a position error signal (PES) representing an error between the actual position of recording head 18A and a target position relative to a target track. A servo control system in control circuitry 22 filters the PES using a suitable compensation filter to generate control signal 38 that is applied to VCM 20. VCM 20, in turn, rotates actuator arm 40A about a pivot to actuate recording head 18A radially over disk surface 17A in a direction that reduces the PES. In some examples, recording head 18A may be actuated over disk surface 17A using one or more secondary actuators, such as a microactuator that actuates a suspension coupling a head slider to actuator arm 40A, or a microactuator that actuates the head slider relative to the suspension (e.g., a thermal actuator, a piezoelectric actuator, etc.).

Servo sectors 32 comprise suitable head positioning information, such as a track address for coarse positioning and servo bursts for fine positioning. In particular, each servo sector 32 may include a phase lock loop (PLL) field, a servo sync mark (SSM) field, a track identification (TKID) field, a sector ID, and a group of servo bursts (an alternating pattern of magnetic transitions) for fine positioning of recording head 18A relative to a particular track 34. The servo bursts may comprise any suitable pattern, such as an amplitude-based servo pattern or a phase-based servo pattern.

As shown in FIG. 2B, actuator assembly 19 comprises primary actuator 20, which is typically a voice coil motor (VCM), and a number of actuator arms 40 (e.g., actuator arms 40A . . . 40E). Recording heads 18 are configured at distal ends of actuator arms 40 via suspensions 42 (e.g., suspensions 42A . . . 42H). Each suspension 42 is configured to suspend a recording head 18 in close proximity over a corresponding disk surface 17. For example, recording head 18A is suspended by topmost actuator arm 40A via suspension 42A over topmost disk surface 17A, and recording head 18H is suspended by lowest actuator arm 40H via suspension 42H over lowest disk surface 17H. Recording heads 18 comprise read and write elements configured for reading and writing control features and data from and to disk surfaces 17. FIGS. 2A-2B are presented for exemplary purposes only; a wide variety of other numbers of disks, disk surfaces, actuators, actuator assemblies, suspensions, and recording heads are contemplated and may be used.

Host 25 generates access commands for reading data from and writing data to HDD 15. Host 25 may be a computing device such as a desktop computer, laptop, server, mobile computing device (e.g., smartphone, tablet, etc.), or any other suitable computing device. In some examples, host 25 may be a test computer that performs calibration and testing functions as part of the HDD manufacturing process. Access commands sent by host 25 to HDD 15 are executed in accordance with method 80 of FIG. 2C, as described in more detail below.

Access commands generated by host 25 and sent to HDD 15, such as commands to read data from a location on HDD 15 and commands to write data to a location on HDD 15, are stored in a host queue (sometimes referred to as a "host-visible queue") implemented by control circuitry 22. In conventional HDDs, host access commands stored in the host queue are selected for execution based on a suitable rotation position optimization (RPO) algorithm. The RPO algorithm sorts host access commands in the host queue into an order that minimizes execution times of the access commands by minimizing access latency (e.g., seek latency of the head and rotation latency of the disk), thereby maximizing the performance of HDD 15 in terms of IOPS (input/output operations per second), which is a measurement of random read and write speeds.

Figure 3:
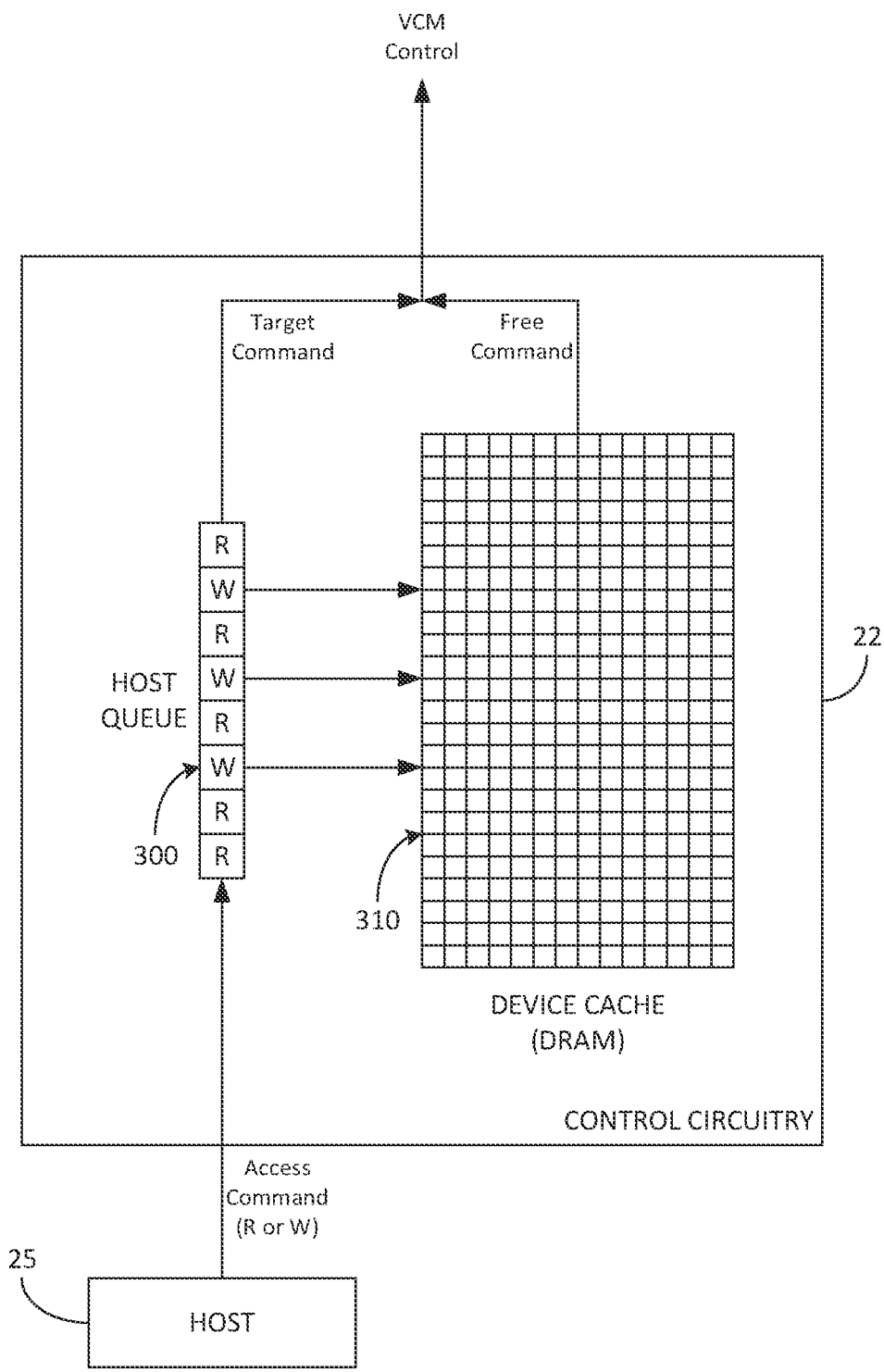
FIG. 3 is a conceptual diagram showing a host queue and a device cache implemented by control circuitry of a data storage device, in accordance with aspects of this disclosure.

FIG. 3 is a conceptual diagram showing a host queue 300 and a device cache 310 implemented by control circuitry 22 of HDD 15, in accordance with aspects of this disclosure. Access commands sent by host 25 to HDD 15, such as read (R) and write (W) commands, are queued in host queue 300. The number of host access commands that may be queued at one time by host queue 300 is referred to as the queue depth (QD). FIG. 3 shows a host queue 300 having a QD of 8. Many other QDs are possible, for instance, host queue 300 may have a QD of 1, 4, 16, 32, 64 and so on. As access commands are completed by HDD 15, new access commands are sent by host 25, so as to maintain host queue 300 at the QD. As the host QD increases, the tail latency of access commands also generally increases. Tail latency refers to the amount of time required to complete a certain percentage of the access commands stored in the host queue, such as 99% for example. In some examples, host 25 may not tolerate an excessive tail latency of the access commands that it has sent to HDD 15, and may require completion of all access commands within a predetermined tail latency. In order to facilitate a desired tail latency, host 25 may limit the QD of host queue 300. In some examples, to minimize tail latency as much as possible, host 25 may limit the QD of host queue 300 to a single access command (QD of 1).

In a mixed read/write workload, where host 25 is sending a random mix of read commands (R) and write commands (W) to HDD 15, host write commands are in general cached to device cache 310 as soon as they are received, to be written to the storage medium at a later time. That is, as write commands are received into host queue 300, they are written to device cache 310 (thereby freeing up a space in host queue 300), and then written from cache 310 to the media (disk) at a later time. Since device cache 310 is occupied mainly by write commands, it is sometimes referred to as a write cache. It should be noted, however, that other types of commands besides write commands (such as read commands) may be serviced by cache 310. Cache 310 may be implemented in DRAM, for example, and generally has a much larger capacity than host queue 300. In some examples, cache 310 has a command storage capacity in the tens of thousands, or more. Thus, as a general matter, since host write commands are immediately moved to cache 310, host queue 300 will consist mostly of host read commands that must be executed directly to the disk.

Figure 4:
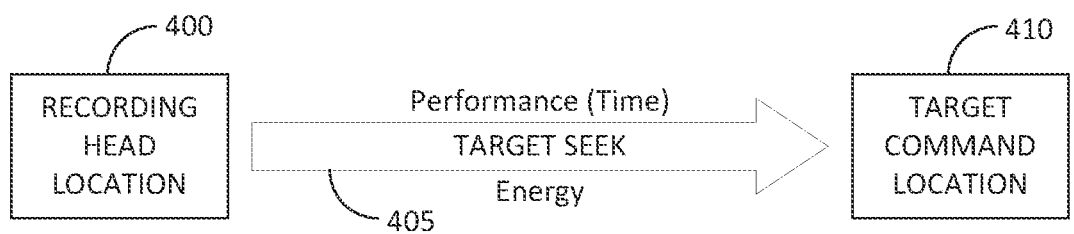
FIG. 4 is a conceptual diagram showing a target seek from a recording head location on a disk to a target command location on the disk, in accordance with aspects of this disclosure.

As noted above, access commands are sorted in host queue 300 into an order that minimizes execution times by minimizing access latency, thereby maximizing the performance of HDD 15. Thus, in selecting a target command from host queue 300 to execute next (step 81), the command that can be executed most quickly (i.e., has the best performance) is initially selected. This is determined primarily by the time required to perform a seek from the current location of the recording head to the location of the target command on the disk. This concept is illustrated in FIG. 4, which is a conceptual diagram showing a target seek 405 from a recording head location 400 to a target command location 410, in accordance with aspects of this disclosure. As shown in FIG. 4, there is an associated time that is required to perform target seek 405, that is, the time required for the actuator to move the recording head from its current location 400 on the disk to the target command location 410 on the disk.

Besides the time required for a seek operation, performing a seek operation also requires an associated energy. In general, a longer and faster seek operation will require more energy than a shorter and slower seek operation. Users, especially high volume users, care about energy consumed in addition to performance, and would generally like to minimize the amount of energy consumed so long as performance is not adversely affected. As an example, if a user were to utilize ½ million disk drives in a data center, even an energy savings of 0.5 W per drive translates to a significant cost savings. For this reason, in addition to considering performance in choosing a target command, step 81 can also consider energy cost, with the goal being to reduce power usage with as small of a cost as possible to performance.

Once a target command is chosen in step 81, step 83 determines whether any "free commands" could be executed during the time required to seek to the selected target command. Commands are referred to as "free commands" if the seek to the free command and the seek to the target command, together, take the same amount of time or less than just seeking to the target command directly. In other words, a command that can be done on the way to the target command without losing time is considered a free command. As described above, as access commands are received into host queue 300, some of them (generally write commands) are written or cached to the much larger device cache 310, and then written from cache 310 to the media (disk) at a later time. Eventually, as the free storage space in cache 310 begins to fill up, it becomes necessary to balance execution of access commands in host queue 300 (generally, read commands) with execution of access commands cached in cache 310 (generally, write commands). Thus, in some implementations, once a target command is chosen in step 81, step 83 determines whether any commands that are cached in device cache 310 are free commands that could be executed during the time required to seek to the selected target command. It should be emphasized, however, that commands that are cached in device cache 310 are just one example of potential free commands. As will be described in further detail below, free commands may also selected from other commands such as, for non-limiting purposes of illustration, background commands of the data storage device or commands from the host queue as in a "leapfrog" sort.

Figure 5:
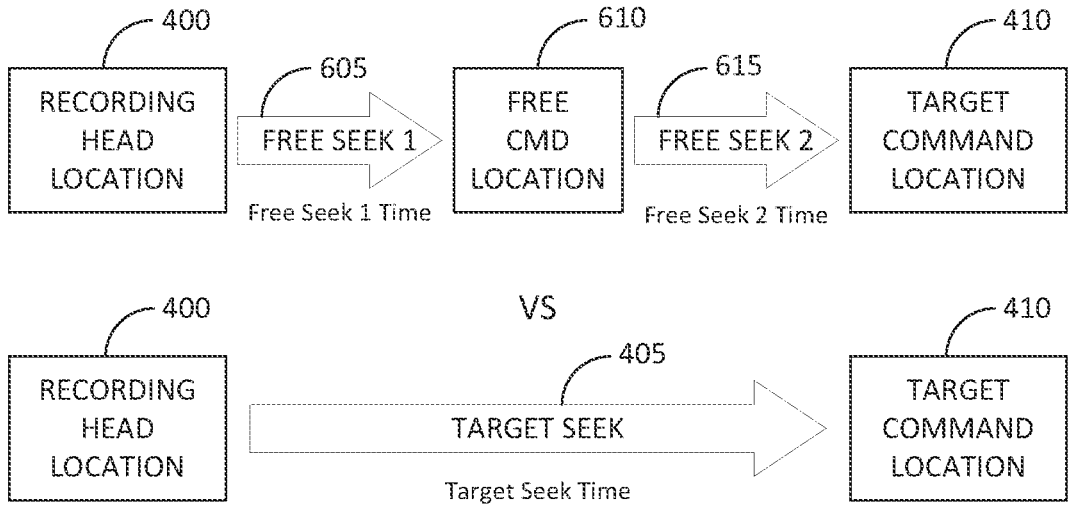
FIG. 5 is a conceptual diagram showing free seek times required to seek from a recording head location to a free command location and then to the target command location relative to a target seek time required to seek directly from the recording head location to the target command location, in accordance with aspects of this disclosure.

This concept is illustrated in FIG. 5, which is a conceptual diagram showing free seek times required to seek from a recording head location to a free command location and then to the target command location relative to a target seek time required to seek directly from the recording head location to the target command location, in accordance with aspects of this disclosure. A target seek 405 from recording head location 400 to target command location 410 requires a "Target Seek Time" to carry out. This is compared to the time required to seek to a potential free command location 610 and then to target command location 410. In particular, free seek 605 from recording head location 400 to free command location 610 takes "Free Seek 1 Time", and free seek 615 from free command location 610 to target command location 410 takes "Free Seek 2 Time". If the total free seek time (Free Seek 1 Time+Free Seek 2 Time) is less than or equal to the target seek time, then command 610 is identified in step 83 as a free command that may be executed on the way to the target command without any sacrifice in performance.

In some examples, step 83 of finding a free command to execute on the way to the target command is carried out only when cache 310 reaches a certain capacity. In one non-limiting example, step 83 is implemented when cache 310 has become 75% full.

Steps 81 and 83 work together to provide a good blend of performance and power use while also keeping device cache 310 healthy (i.e., having adequate free storage space available). In some scenarios, however, steps 81 and 83 may not function together optimally. For example, in step 81, a target command with sub-optimal performance but requiring only a low power seek may be chosen in an effort to save power. Because the target command is likely further away on the disk, this extra time makes it easier to find free commands in step 83 to execute on the way to the target command. Because free commands in step 83 are picked based on performance (time) and not energy cost, the additional seeks required to incorporate the free command on the way to the target command could potentially undermine the power savings achieved in step 81.

This issue becomes more apparent at small QDs, and in particular at a QD of one for a random mixed read/write workload. With a QD of one, there is only one command in host queue 300 to choose from in step 81. However, even at a QD of one, there is another option available in step 81. If the location of the target command (the only command in host queue 300) is sufficiently distant that there is a likelihood of not getting to the command location during the current disk revolution even with a full speed seek, HDD 15 may opt to purposely "blow a revolution" and seek slower to save power. "Blowing a revolution", in this description, means not attempting to seek to a command location during the current disk revolution, but rather waiting until the next disk revolution to allow more time to seek to the command location. This may sometimes be a better decision than doing a full speed seek to the target command location with a high likelihood of missing, and possibly blowing the revolution anyway. When a revolution is purposely blown in favor of a low power seek, however, step 83 now has an extra revolution of time to find free commands. It may be possible to find time for multiple free commands during a full disk revolution, but multiple seeks to those command locations may consume a substantial amount of power and diminish or eliminate the power saving that was the reason for blowing the revolution in step 81. In this example, host 25 may potentially see both sub-optimal performance (due to the blown revolution) and increased power costs (due to the energy expended on the free commands), which is not a desirable result.

Steps 85-89 of method 80 address this potential issue by making the selection process for choosing free commands pickier. After determining that there is time available for a free command in step 83, the energy cost of the free command is evaluated in step 85. While some free commands are farther away and require high power usage (particularly with a QD of one), other free commands may have low power requirements (i.e., two short seeks). Step 85 evaluates the energy required to seek to the free command location and then to the target command location, and compares that to the energy required to just seek directly to the target command location.

Figure 6:
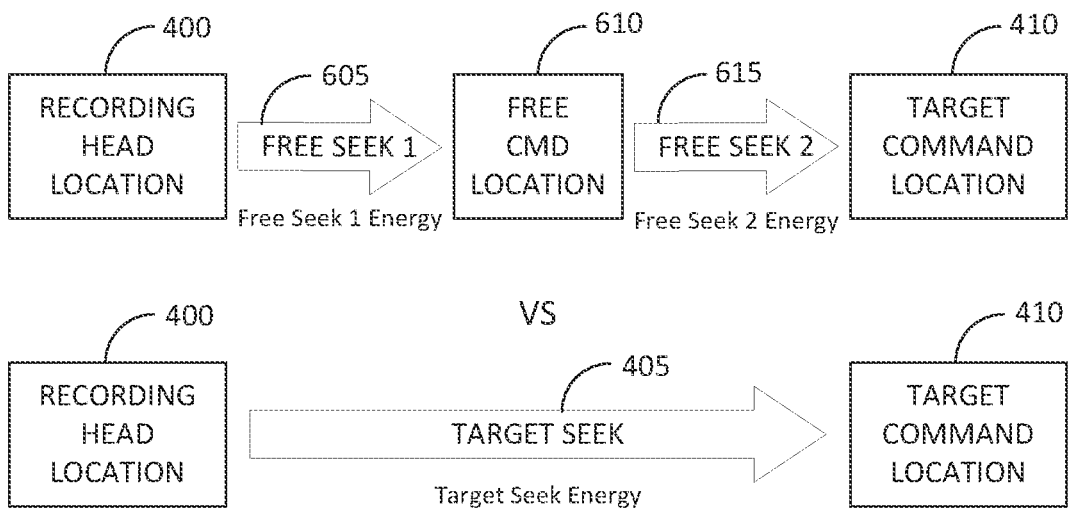
FIG. 6 is a conceptual diagram showing free seek energies required to seek from a recording head location to a free command location and then to the target command location relative to a target seek energy required to seek directly from the recording head location to the target command location, in accordance with aspects of this disclosure.

This concept is illustrated in FIG. 6, which is a conceptual diagram showing free seek energies required to seek from a recording head location to a free command location and then to the target command location relative to a target seek energy required to seek directly from the recording head location to the target command location, in accordance with aspects of this disclosure. Target seek 405 from recording head location 400 to target command location 410 requires a "Target Seek Energy" to carry out. This is compared to the energy required for a seek to free command location 610 before seeking to target command location 410. In particular, free seek 605 from recording head location 400 to free command location 610 requires "Free Seek 1 Energy", and free seek 615 from free command location 610 to target command location 410 requires "Free Seek 2 Energy". The difference between the sum of the two free seek energies and the target seek energy, or [Free Seek 1 Energy+Free Seek 2 Energy]−[Target Seek Energy], is the seek energy difference and represents the energy cost of executing a free command.

Figure 7:
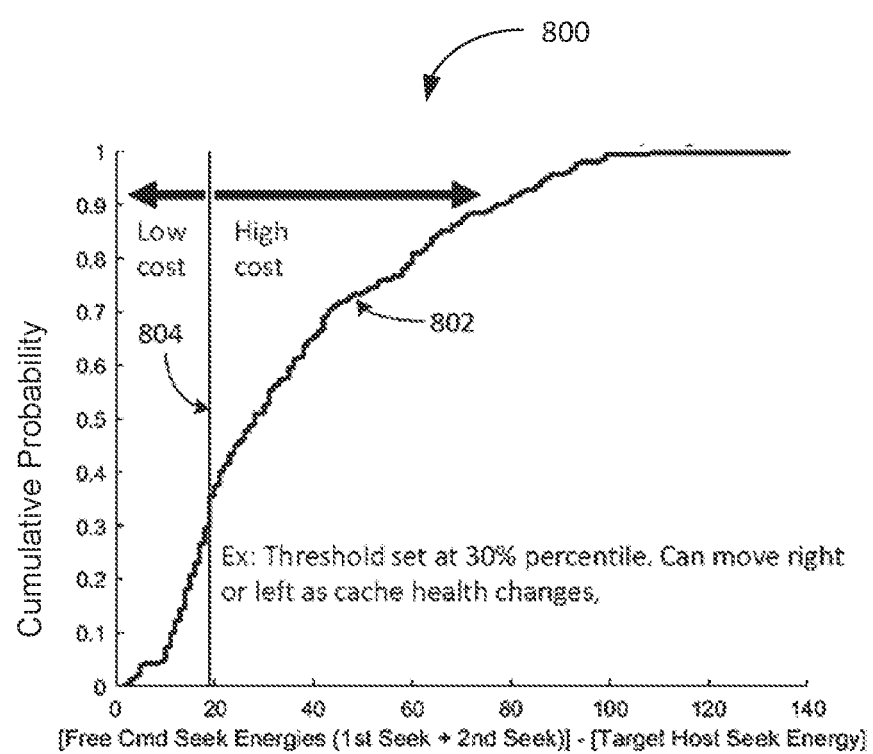
FIG. 7 is a cumulative probability chart showing seek energy differences relative to a seek energy difference threshold, in accordance with aspects of this disclosure.

The seek energy differences of all potential free commands can be plotted to arrive at a distribution. An example distribution is shown in FIG. 7, which is a cumulative probability chart 800 of seek energy differences, in accordance with aspects of this disclosure. The x-axis spans a range of seek energy differences in terms of generic energy units, and the y-axis tracks the cumulative distribution of commands with those seek energy differences.

Ideally, only free commands having a relatively low seek energy difference should be executed. It is advantageous to "shop around" for free commands, and choose whether to execute a free command based on where it falls in the distribution (i.e., such as distribution 802 of FIG. 7). This is implemented by creating a seek energy difference threshold. In FIG. 7, for example, a threshold 804 has been set at a seek energy difference of about 19, which corresponds to a cumulative probability of about 30% as shown on the vertical axis. What a cumulative probability of about 30% means is that roughly 30% of potential free commands have a seek energy difference less than 19 (left side of threshold 804, indicated as "low cost"), and roughly 70% of potential free commands have a seek energy difference greater than 19 (right side of threshold 804, indicated as "high cost"). If the seek energy difference of a free command is less than the threshold, then the free command is executed on the way to the target command (step 87). On the other hand, if the seek energy difference of a free command is greater than the threshold, the free command is not executed and a seek is performed directly to the target command (step 89).

A potential concern in being pickier about executing free commands is the potential for running out of free storage space in cache 310. To alleviate this concern, the seek energy difference threshold is moved dynamically as a function of cache space availability. In particular, when more unused cache space is available, threshold 804 is moved to the left in FIG. 7. By lowering the seek energy difference threshold, only free commands with very low power usage will be chosen. Conversely, when unused cache space is low, threshold 804 is moved to the right in FIG. 8. By raising the seek energy difference threshold, more free commands (with higher power usages) are available to be chosen. If unused cache space is critically low, the threshold may be moved fully to the right (to the 100th percentile) such that all free commands will be allowed in order to quickly restore unused cache space. By dynamically moving the seek energy difference threshold based on cache space availability, both performance and power savings are optimized.

As mentioned above, while free commands are often selected from host commands that are stored in cache 310, free commands may be selected from other types of commands and/or commands stored in other locations. In one non-limiting example, free commands may be selected from background commands of the data storage device. In another non-limiting example, free commands may be selected from the host queue as in a "leapfrog" sort in which an access command in an "active queue" is always chosen as the next target command, regardless of performance or energy cost. In the leapfrog sort, there is a "pending queue" of access commands following the active queue that are executed in FIFO order. However, if any of the commands in the pending queue can be executed in the time that it takes to seek to the target command (the command in the active queue), then such commands are considered free commands and are executed out of their FIFO order ("leapfrogged") on the way to the target command. However, the leapfrog sort does not assess energy costs in deciding whether to execute free commands and is prone to creating unintended energy costs. By implementing steps such as steps 85-89 of this disclosure to consider added energy cost before executing a free command, the leapfrog sort can be improved to optimize energy consumption as well as performance. Leapfrog sorts are described in more detail in U.S. Pat. No. 11,010, 099, which is incorporated herein by reference.

In this description, access commands in host queue 300 have been primarily described as read commands, while access commands in cache 310 have been primarily described as write commands. However, this is not always the case and this disclosure is not so limited. For example, there may be read commands cached in cache 310, in which case a "free read" may be performed on the way to a target command location. Similarly, write commands may sometimes remain in host queue 300 rather than being cached, and thus the target command chosen from host queue 300 may sometimes be a write command.

This description has focused primarily on picking a free command that may be executed during the target seek time required for a target seek from a recording head location to a target command location. In some examples, multiple (two or more) free commands may be executed during the target seek time required for the target seek from the recording head location to the target command location.

The methods and flow diagrams disclosed herein are implemented by control circuitry 22, which may be implemented partially or wholly into an integrated circuit (IC) such as a system-on-a-chip (SOC), arm electronics, and/or any other suitable circuitry or controller. Control circuitry 22 may further comprise a microprocessor executing instructions operable to perform the methods and flow diagrams described herein. The instructions may be stored in a computer-readable medium, such as a non-volatile semiconductor memory device that may be external to the microprocessor or integrated with the microprocessor in an SOC. The instructions may alternatively be stored on a disk and read into a volatile semiconductor memory when the HDD is powered on. Control circuitry 22 may comprise logic circuitry such as state machine circuitry or other suitable logic circuitry. The methods and flow diagrams disclosed herein may be implemented using analog circuitry, digital circuitry, or a combination thereof.

One or more processing devices may comprise control circuitry 22 and may perform, individually and/or collectively, some or all of the functions of control circuitry 22. Such processing devices may be part of the HDD and/or abstracted away from physically proximity to the HDD. Such processing devices may be part of or proximate to one or more unitary products, racks comprising multiple data storage devices, physical or virtual servers, local area networks, storage area networks, data centers, and/or cloud services. Disk drives or HDDs as disclosed herein may include magnetic, optical, hybrid, or other types of disk drives. Devices such as computing devices, data servers, media content storage devices, and other devices may comprise the storage media and control circuitry described herein.

While certain embodiments are described herein, these embodiments are presented by way of example only, and do not limit the scope of this disclosure. Various omissions, substitutions and changes may be made without departing from the spirit and scope of this disclosure. The methods and processes described herein are not limited to any particular sequence and may be used independently or combined in various ways. Some method or process steps may be omitted and other steps added in some implementations. Nothing in this description implies that any particular feature, component, characteristic, or step is necessary or indispensable. Many variations, modifications, additions, and improvements are possible and fall within the scope of this disclosure as defined by the following claims.

The invention claimed is:

1. A data storage device comprising:
 a magnetic storage medium;
 a recording head configured to be actuated over the magnetic storage medium; and
 control circuitry configured to:
  select a target command from one or more access commands received from a host and stored in a host queue;
  select a free command that can be executed during a target seek time required for a target seek from a recording head location to a target command location on the magnetic storage medium;
  determine a seek energy difference between (a) a sum of a first free seek energy required to seek from the recording head location to a free command location and a second free seek energy required to seek from the free command location to the target command location, and (b) a target seek energy required to seek from the recording head location directly to the target command location;
  in response to the seek energy difference being less than a predetermined threshold, seek to and execute the free command and then seek to and execute the target command; and
  in response to the seek energy difference being greater than the predetermined threshold, seek directly to and execute the target command.

2. The data storage device of claim 1, wherein the control circuitry is further configured to select the target command by balancing the target seek time with an energy cost of the target seek.

3. The data storage device of claim 1, wherein the control circuitry is further configured to dynamically move the predetermined threshold based on an amount of free storage space remaining in a device cache.

4. The data storage device of claim 3, wherein the control circuitry is further configured to:
 responsive to the amount of free storage space remaining in the device cache increasing, dynamically move the predetermined threshold to a decreased seek energy difference; and
 responsive to the amount of free storage space remaining in the device cache decreasing, dynamically move the predetermined threshold to an increased seek energy difference.

5. The data storage device of claim 3, wherein the host queue has a queue depth (QD) of one.

6. The data storage device of claim 3, wherein the control circuitry is further configured to move write commands stored in the host queue and received from the host to the device cache.

7. The data storage device of claim 6, wherein:
 the target command is a read command; and
 the free command is a write command.

8. The data storage device of claim 3, wherein the device cache is a Dynamic Random-Access Memory (DRAM).

9. The data storage device of claim 3, wherein the control circuitry is further configured to select the free command from the device cache.

10. The data storage device of claim 1, wherein the control circuitry is further configured to select the free command from background commands of the data storage device.

11. The data storage device of claim 1, wherein the control circuitry is further configured to select the free command from the host queue as part of a leapfrog sort.

12. The data storage device of claim 1, wherein the control circuitry is further configured to execute multiple free commands during the target seek time required for the target seek from the recording head location to the target command location.

13. A method for executing access commands received from a host in a data storage device having a recording head configured to be actuated over a magnetic storage medium, the method comprising:
 selecting a target command from one or more access commands received from the host and stored in a host queue;
 selecting a free command that can be executed during a target seek time required for a target seek from a recording head location to a target command location on the magnetic storage medium;
 determining a seek energy difference between (a) a sum of a first free seek energy required to seek the recording head from the recording head location to a free command location and a second free seek energy required to seek the recording head from the free command location to the target command location, and (b) a target seek energy required to seek the recording head from the recording head location directly to the target command location; and
 (1) in response to the seek energy difference being less than a predetermined threshold, seeking the recording head from the recording head location to the free command location, based at least in part on executing the free command, and then seeking the recording head from the free command location to the target command location, based at least in part on executing the target command; or
 (2) in response to the seek energy difference being greater than the predetermined threshold, directly seeking the recording head from the recording head location to the target command location, based at least in part on executing the target command.

14. The method of claim 13, further comprising:
 selecting the target command by balancing the target seek time with an energy cost of the target seek.

15. The method of claim 13, further comprising:
 dynamically moving the predetermined threshold based on an amount of free storage space remaining in a device cache.

16. The method of claim 15, further comprising:
responsive to the amount of free storage space remaining in the device cache increasing, dynamically moving the predetermined threshold to a decreased seek energy difference; and
responsive to the amount of free storage space remaining in the device cache decreasing, dynamically moving the predetermined threshold to an increased seek energy difference.

17. The method of claim 15, further comprising:
moving write commands stored in the host queue and received from the host to the device cache.

18. The method of claim 17, wherein:
the target command is a read command; and
the free command is a write command.

19. One or more processing devices or components configured, individually or in combination, to execute access commands received from a host in a data storage device having a recording head configured to be actuated over a magnetic storage medium, the one or more processing devices or components comprising, individually or in combination:
means for selecting a target command from one or more access commands received from the host, wherein the one or more access commands are stored in a host queue;
means for selecting a free command that can be executed during a target seek time required for a target seek from a recording head location to a target command location on the magnetic storage medium;
means for determining a seek energy difference between (a) a sum for a first seek energy required to seek the recording head from the recording head location to a free command location and a second seek energy required to seek the recording head from the free command location to the target command location, and (b) a target seek energy required to seek the recording head from the recording head location directly to the target command location; and
(1) in response to the seek energy difference being less than a predetermined threshold, means for seeking the recording head from the recording head location to the free command location, based at least in part on executing the free command, and then means for seeking the recording head from the free command location to the target command location, based at least in part on executing the target command; or
(2) in response to the seek energy difference being greater than the predetermined threshold, means for directly seeking the recording head from the recording head location to the target command location, based at least in part on executing the target command.

20. The one or more processing devices or components of claim 19, further comprising, individually or in combination:
means for selecting the target command by balancing the target seek time with an energy cost of the target seek.

21. The one or more processing devices or components of claim 19, further comprising, individually or in combination:
means for dynamically moving the predetermined threshold based on an amount of free storage space remaining in a device cache.

22. The one or more processing devices or components of claim 21, further comprising, individually or in combination:
means for dynamically moving the predetermined threshold to a decreased seek energy difference, responsive to the amount of free storage space remaining in the device cache increasing; and
means for dynamically moving the predetermined threshold to an increased seek energy difference, responsive to the amount of free storage space remaining in the device cache decreasing.

23. The one or more processing devices or components of claim 21, further comprising, individually or in combination:
means for moving write commands stored in the host queue and received from the host to the device cache.

24. The one or more processing devices or components of claim 23, wherein:
the target command is a read command; and
the free command is a write command.

* * * * *